Oct. 27, 1936.    H. WOLLNER    2,058,544
UNIVERSAL JOINT MECHANISM
Filed July 17, 1935    2 Sheets-Sheet 1
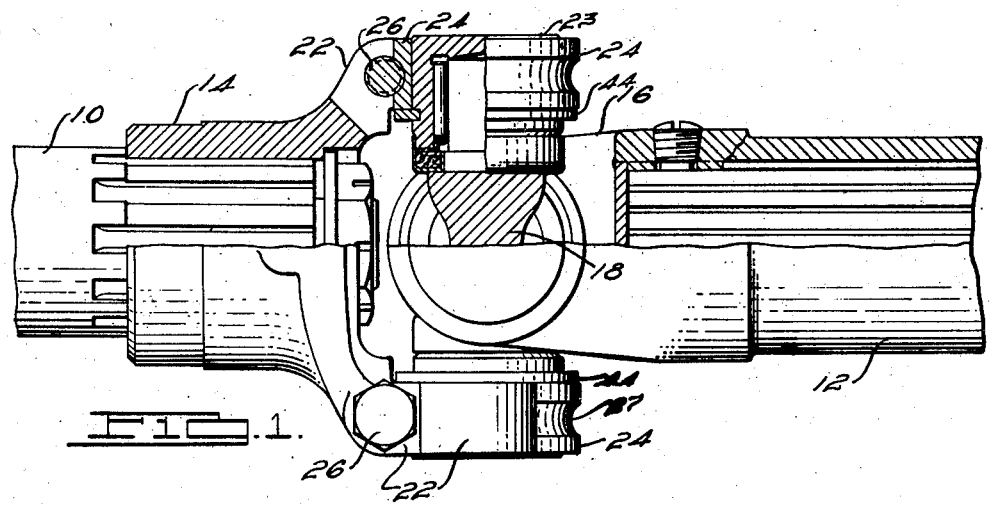
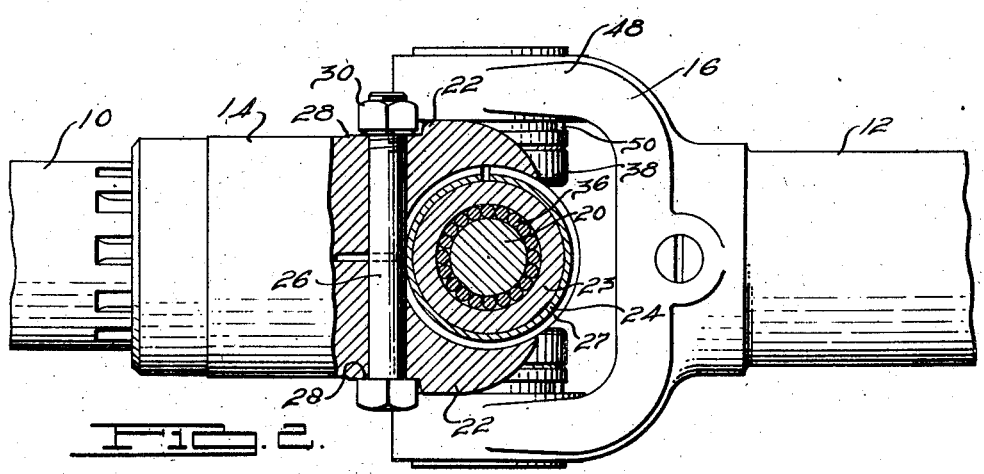
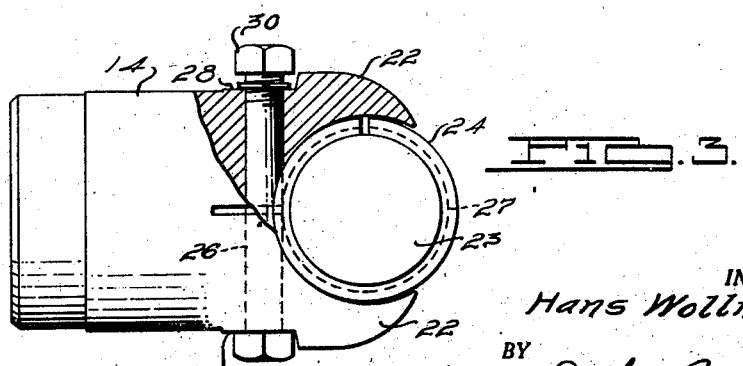
INVENTOR.
Hans Wollner.
BY
Barnes, Dickey, Pierce & Hann
ATTORNEYS.

Oct. 27, 1936.  H. WOLLNER  2,058,544
UNIVERSAL JOINT MECHANISM
Filed July 17, 1935   2 Sheets-Sheet 2
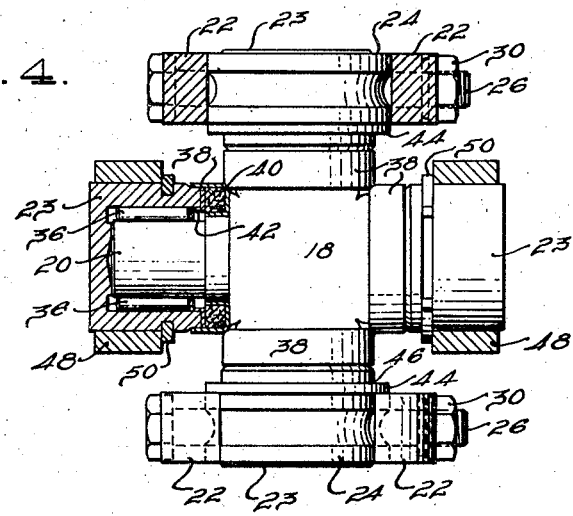
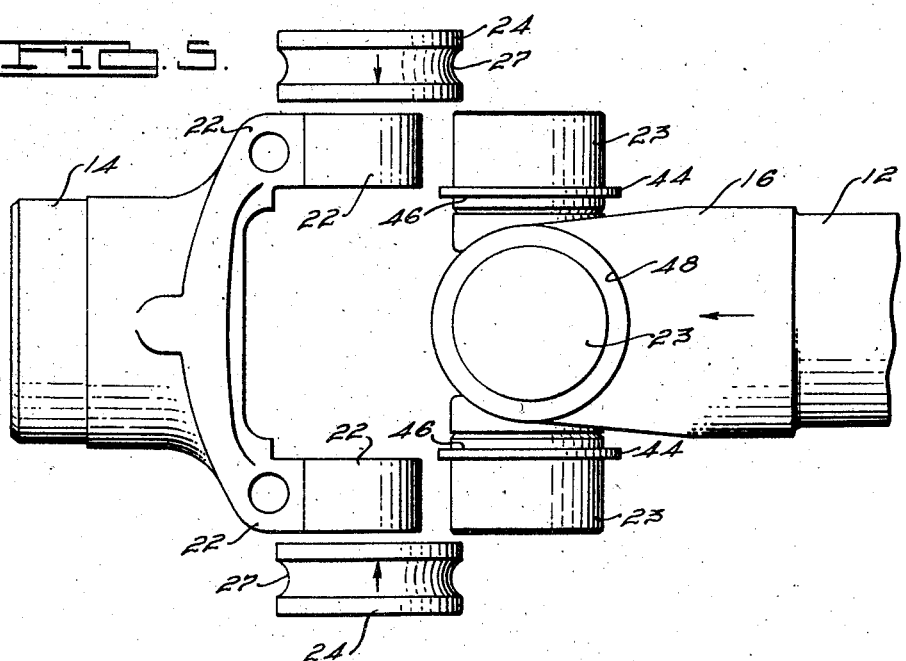
INVENTOR.
Hans Wollner.
BY
ATTORNEYS.

Patented Oct. 27, 1936

2,058,544

UNITED STATES PATENT OFFICE 2,058,544

UNIVERSAL JOINT MECHANISM

Hans Wollner, Detroit, Mich., assignor to Universal Products Company, a corporation of Delaware Application July 17, 1935, Serial No. 31,771

3 Claims. (Cl. 64—17)

REISSUED

The present invention relates to universal joint mechanism and more particularly to a readily demountable type of universal joint.

It is an object of the present invention to provide a universal joint embodying readily demountable members, which is simple in construction, requires few parts, may be economically manufactured and is durable and positive in operation.

It is a further object of the present invention to provide a universal joint comprising two yokes and a coupling member, so constructed that one or both of the yokes may be readily demounted from the connecting member.

It is a further object of the present invention to provide a connection between a yoke and a coupling as above mentioned, in which the yoke is connected to the coupling through an intermediate member, and embodying improved means to retain the intermediate member in assembled relation with respect to the yoke.

It is a further object of the present invention to provide a construction for connecting a yoke and a coupling through an intermediate bushing, the coupling being journaled in the bushing, which is retained in the yoke by one or more bolts which pass through the yoke and are received in a peripheral recess or groove formed in the bushing.

It is a further object of the present invention to provide a universal joint of the last mentioned type in which the bolt also serves to restrict the opening in the yoke, thereby preventing rotation between the yoke and the bushing member.

It is a further object of the present invention to provide a joint of the last mentioned type in which a roller bearing cup is assembled between the bushing and the coupling and in which the tightening down of the above mentioned bolt serves to hold the yoke, the intermediate member and the bearing cup stationary with respect to each other.

Other objects and advantages of the present invention appear in the following description and in the appended claims.

Referring to the drawings, throughout which corresponding reference characters are used to represent corresponding parts, Figure 1 is a plan view of a demountable universal joint embodying the present invention;

Fig. 2 is a view in side elevation with respect to Fig. 1;

Fig. 3 is a view of the yoke and intermediate connecting member shown in Figs. 1 and 2;

Fig. 4 is a view of a coupling and certain of the yoke members, shown in section, embodying the present invention; and Fig. 5 is an exploded view illustrating the method of assembling the parts of a joint in accordance with the present invention.

In the form illustrated the demountable universal joint of the present invention comprises generally two yokes, to which associated shaft sections are secured, preferably by splining; and a coupling member to which the yokes are respectively rotatably connected. Universal joints of this general character are well known and the present invention is directed principally to an improved form of demountable connection between either or both of the yokes and the coupling.

As illustrated, each yoke includes a pair of spaced bearing portions, each of which is made up of two legs, the rear ends of which are joined together, and which may be forced inwardly with respect to each other somewhat by a bolt which passes through both legs near the rear ends thereof. The inner surfaces of both legs of each pair are arcuate and are adapted to freely receive a split circular bushing. The bushing is provided with a peripheral groove, into which the above mentioned bolt enters, and holds the intermediate member in assembled relation with respect to the associated legs.

In the form illustrated, the coupling comprises four radially disposed co-planar trunnions, spaced ninety degrees (90°) apart, opposite pairs of which are associated respectively with the two yokes. A bearing cup, formed to house a roller bearing assembly, is preferably fitted over each trunnion. The outside dimensions of the bearing cups are such that they fit snugly within but may be relatively freely inserted into the bushings.

In assembling a coupling with a demountable yoke in accordance with the present invention, bearing cups are fitted over the ends of the trunnions associated with the demountable yoke. Thereafter, the coupling and the bearing cups are moved into the space between the yoke legs, the spacing between the forward ends of each pair of legs being somewhat larger than the diameter of the bearing cups. With the parts in this relation, a bushing may be fitted over each bearing cup, between the respective legs of the yoke. Upon insertion and tightening of the bolt associated with each pair of legs, the legs of each pair are drawn together, restricting the bushings and forming a tight joint between the legs and the bushings, and between the bushings and the bearing cups. As mentioned above also, each bolt enters a peripheral groove in the associated bushing, and further prevents the latter from being removed from between the legs. The tight joint between the legs, the bushings and the bearing cups, causes these elements to be stationary with respect to each other, and the rotation between the yoke and the coupling is thus effected entirely through the roller bearing unit.

As will be evident from further description, the above described demountable yoke may be associated with either or both shafts. To simplify the drawings, however, one yoke is illustrated as of the demountable type, and the other is illustrated as of the conventional type.

Referring to the drawings, shafts 10 and 12 are secured respectively to yokes 14 and 16 by a conventional splined connection. Yokes 14 and 16 are connected together through coupling 18 which may be of any conventional type and is best shown in Fig. 4. As will be evident, coupling 18 comprises four similar radially disposed co-planar trunnions, spaced 90° apart, one of which is designated 20.

Yoke 14 is bifurcated, each bifurcated portion including a pair of spaced apart legs 22, the rear ends of which are joined together, and the forward ends of which are spaced apart a distance slightly in excess of the outside diameter of the bearing cups 23, which are preferably associated with the respective trunnions. The inner surfaces of the legs 22 of each pair are arcuately formed, the radius of curvature being substantially equal to the outer radius of the split bushings 24. The legs 22 of each pair are apertured near the rear ends thereof to receive a stud 26, which passes freely therethrough. Flat seats 28 are formed on legs 22 to accommodate the heads of bolts 26 and the tightening nuts 30 associated therewith. A midportion 32 of each bolt 26 protrudes into the journal space between the legs of each pair for cooperation with a bushing 24.

Bushings 24 may be of conventional split construction, formed of spring-like material. In accordance with the present invention the periphery of each bushing is grooved as at 27 to cooperate with an associated bolt 26. The inner diameter of each bushing 24 is substantially equal to the outer diameter of each of the bearing cups 23, one of which is preferably associated with each of the trunnions 20.

As illustrated, each bearing cup 23 is of substantially cup-like formation, and serves as a housing for the roller bearings 36. As best shown in Fig. 4 each cup 23 is preferably connected to the associated trunnions through a packing ring 38, a packing gland 40, and a retaining ring 42. It will be understood that in assembled relation, each cup 23 is pressed tightly into engagement with the associated retaining ring 42, compression packing gland 40 to thereby form a joint which prevents the escape of lubricant from within the cup.

In assembling the parts directly associated with yoke 14, the associated bearing cups 23 are placed over the ends of the corresponding trunnions. Thereafter, the legs 22 are moved transversely with respect to the bearing cups 23 to the positions shown in Fig. 2, the end spacing between legs 22 being somewhat larger than the outside diameter of cups 23, as previously mentioned. With the parts in this relationship, a bushing 24 is placed over each bearing cup, the free spacing between the legs 22 being slightly in excess of the free outside diameter of the bushings, as best shown in Fig. 3. Thereafter, a bolt 26 associated with each pair of legs may be inserted in the corresponding opening and tightened down, drawing the outer ends of the legs 22 together into engagement with the outer surface of the corresponding bushing 24, restricting the latter, and causing the associated bearing cups to be engaged thereby. It will be understood that each bolt 26 is tightened down sufficiently so that the legs 22 of each pair, the corresponding bushing 24 and bearing cup 23 are stationary with respect to each other. As previously mentioned, also, each bolt 26 enters the peripheral recess 27 formed in each bushing 24, so that, with the parts in assembled relation, axial movement of each bushing with respect to its associated bearing cup is prevented.

After insertion of the bolts 26, which serve to locate bushings 24 axially of the legs 22, clip rings 44, which are preferably of the form disclosed and claimed in the co-pending application of the present application, Serial No. 21,515, filed May 15, 1935 and assigned to the same assignee as the present application, are preferably inserted in peripheral recesses 46 formed in bearing cups 23, to accurately center cross 18 in yoke 14. As there described, rings 44 are preferably formed of spring material, bent into the arc of a circle of radius slightly less than the radius of the associated recess. The ends are flared outwardly somewhat to permit ready snapping of each ring into the recess. The rings 44 bear against the faces of the bushings, and in addition to axially aligning coupling 18 and yoke 14, also serve to draw the bearing cups inwardly with respect to the bushings 24, to thereby more securely seal the joints between the inner ends of the bearing cups and the trunnions.

It will be evident from the foregoing that the completed joint is rigid and reliable in operation. Since the joints between the legs 22, bushings 24, and bearing cups 23 are such as to cause these elements to be relatively stationary, it will be apparent that all of the rotation between yoke 14 and the coupling 18 is effected through the roller bearings. It will be further evident that the joint may be readily disassembled by merely removing the bolts 26, after which the bushings 24 may be freely slipped from the cups 23, and after which the cups 23 and coupling 18 may be freely withdrawn from between the legs 22.

As mentioned above, the above described demountable type yoke may be used in connection with either or both of the shaft sections 10 and 12. To simplify the drawings, however, the yoke 16 associated with shaft 12 is illustrated as of the conventional type, embodying the journal section 48, within which the associated bearing cups 23 are press fitted. The journal portions 48 are further secured in position axially of the associated cups by retaining rings 50, which may be of the same type described in connection with yoke 14, and which also serve to force the associated cups inwardly with respect to the corresponding trunnions, thereby more tightly sealing the joint between the cups and trunnions.

Although a specific embodiment of the present invention has been described, it will be evident that various changes may be made in the form, number and arrangement of parts within the spirit and scope thereof, as defined in the appended claims.

What is claimed is:

1. Universal joint mechanism comprising, in combination, a coupling having a trunnion, a yoke having legs spaced from each other at the forward ends and connected together at the rear ends to provide a journal for said trunnion, an intermediate member interposed between said trunnion and said journal and having a peripheral recess, and a bolt passed through said legs adjacent the rear ends thereof and cooperative with said recess to retain said member in place.

2. Universal joint mechanism comprising, in combination, a coupling having a trunnion, a yoke having legs spaced from each other at the forward ends and connected together at the rear ends to provide a journal for said trunnion, a bearing cup disposed to be fitted over the end of said trunnion, a bushing disposed to be interposed between said bearing cup and said journal and having a peripheral groove formed therein, and a bolt spaced through said legs adjacent the rear ends thereof to restrict said journal and enter said peripheral groove to hold said bushing in place.

3. Universal joint mechanism comprising, in combination, a coupling having a trunnion, a yoke having legs spaced from each other at the forward ends and connected together at the rear ends to provide a split journal for said trunnion, a bearing cup disposed to be fitted over the end of said trunnion, a split bushing disposed to be interposed between said bearing cup and said journal and having a peripheral recess, and a bolt passed through said legs adjacent the rear ends thereof and received in said recess to restrict the size of said journal and bushing and secure said bearing cup, bushing and journal in relative stationary relation.

HANS WOLLNER.